United States Patent [19]
Eaton et al.

[11] 4,063,986
[45] Dec. 20, 1977

[54] PORTABLE TIRE PATCH HOLDING CLAMP AND METHOD

[75] Inventors: Bill W. Eaton, Goodfield; Donald G. Boundy, E. Peoria, both of Ill.

[73] Assignee: Caterpillar Tractor Co., Peoria, Ill.

[21] Appl. No.: 705,495

[22] Filed: July 15, 1976

[51] Int. Cl.² .............................................. B29H 5/16
[52] U.S. Cl. .................................... 156/394; 156/95; 269/127; 425/11; 425/16
[58] Field of Search ........................ 156/94, 95, 96, 97, 156/98, 394; 152/367–373, DIG. 8; 264/36; 425/11–17; 269/127

[56] References Cited
U.S. PATENT DOCUMENTS

| | | | |
|---|---|---|---|
| 2,010,861 | 8/1935 | James | 425/14 |
| 2,356,447 | 8/1944 | Cline | 425/11 |
| 2,365,109 | 12/1944 | Ridd | 425/12 |
| 2,453,303 | 11/1948 | Cline | 425/11 |
| 2,843,877 | 7/1958 | Wolfe | 425/11 |
| 2,947,033 | 8/1960 | Ryan | 264/36 |
| 3,052,921 | 9/1962 | Robinson | 425/14 |
| 3,849,941 | 11/1974 | Barnes | 156/98 |
| 3,899,220 | 8/1975 | Grawey et al. | 152/182 |

FOREIGN PATENT DOCUMENTS 450,885  8/1948  Canada .............................. 156/96

Primary Examiner—Charles E. Van Horn
Assistant Examiner—John E. Kittle
Attorney, Agent, or Firm—Phillips, Moore, Weissenberger, Lempio & Majestic

[57] ABSTRACT

A portable holding clamp for applying patches for the repair of tire sidewalls comprises a rigid beam member adjustable telescopically to accommodate tires having various chord widths, integrally attached rim coupling means, manually actuated patch pressurizing means located midway of the beam and a quick attaching and holding means for attaching the clamp to a track or tread belt of the tire. The quick attaching and holding means includes a key-shaped slot formed on the beam, opposite the rim coupling means, for facilitating rapid adjustment of a holding chain on which either a key-shaped latching member or a barbed latching member is used for quick attachment to the tire, depending on whether the tire has a track belt or tread belt mounted therearound. Thus, the clamp can be quickly and conveniently positioned to effect tire sidewall patch repairs. A method of repairing such tire sidewalls is also disclosed herein.

5 Claims, 4 Drawing Figures

U.S. Patent  Dec. 20, 1977  4,063,986
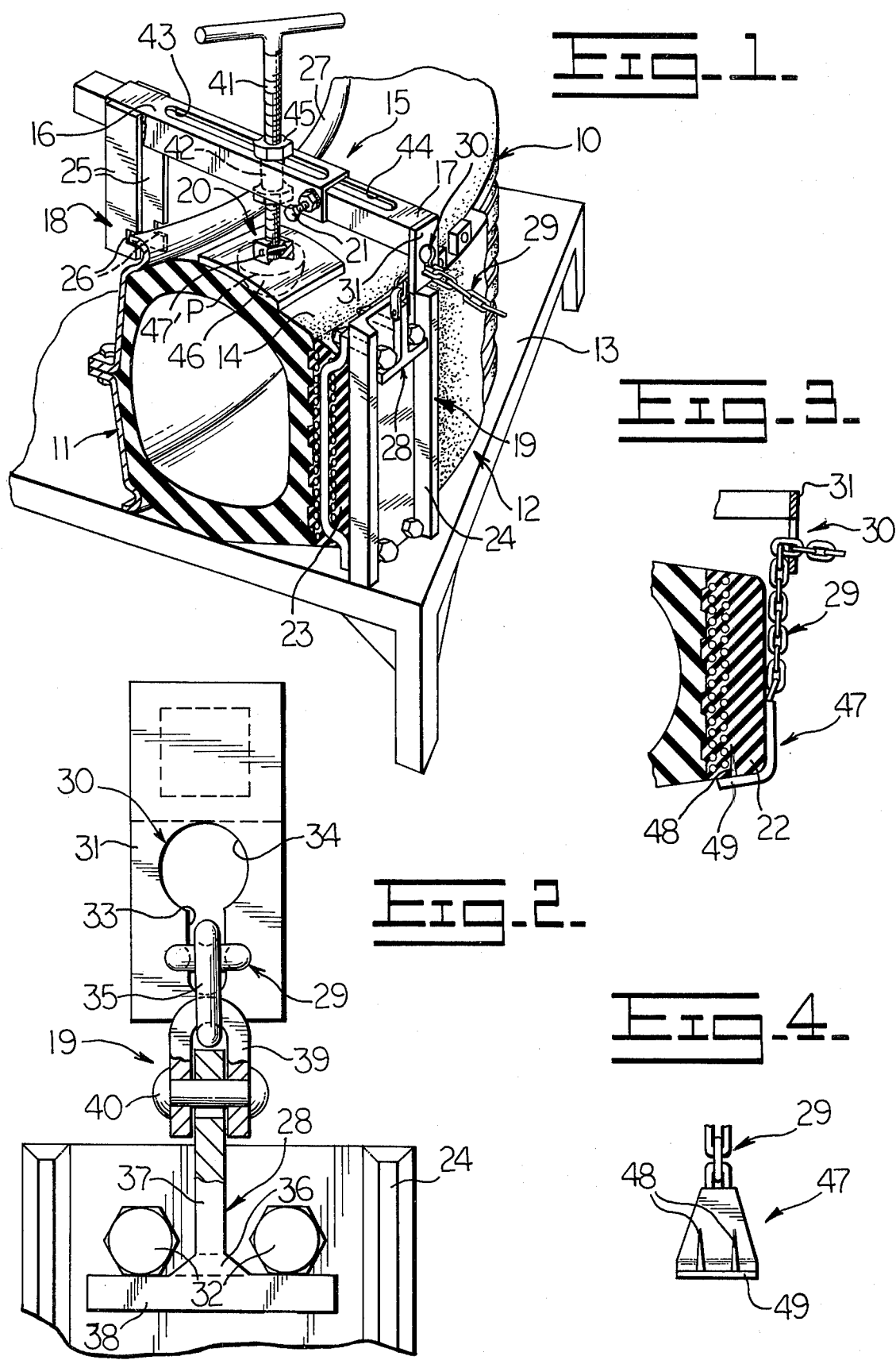

PORTABLE TIRE PATCH HOLDING CLAMP AND METHOD

BACKGROUND OF THE INVENTION

This invention relates to the repair of tire sidewalls, especially the large tires employed on earthmoving vehicles, and more particularly relates to a portable holding clamp which can be quickly and conveniently positioned over the tire for applying sidewall tire patches for effecting such repair.

In the past, tire manufacturers and supply firms have utilized "spotters", i.e., C-clamps, of various shapes and sizes to secure, heat and vulcanize patches to repair damaged tires. Until the advent to the beadless tire, such as the type disclosed in the U.S. Pat. No. 3,899,220 assigned to the assignee of this application, most earthmoving tires have been constructed similar to smaller automotive tires and, therefore, patch spotters and other repair tools have merely been enlarged to fit around, or within, the broader and deeper carcass. Thus, even though such repairs have been recently facilitated by the development and use of self-adhering or chemically-bonded patches, it became apparent that such prior art spotters and other tire repairing tools would not suffice.

The present invention is concerned with the structural details of a portable clamp and its method of use. All other aspects of tire repair is deemed to be well known in the art.

SUMMARY OF THIS INVENTION

An object of this invention to improve over the above-mentioned prior art tire repair tools and methods and to provide a portable clamp which is readily adaptable and convenient for spotting and bonding tire sidewall repair patches.

It is another object of this invention to provide a portable clamp for repairing tire sidewalls which can be adapted to the recently developed beadless tires with a track or tread belt, as well as other commercial tires.

Another object of this invention is to provide a method for the rapid repair of sidewalls of tires of the beadless type with either a track or tread belt.

The portable holding clamp for applying sidewall tire patches which accomplishes the foregoing objects comprises a rigid, telescopically adjustable beam member which extends in straddling relationship over the sidewall of a tire and attached rim, coupling means on one end of the beam member to attach the clamp to the rim, a manually actuated pressurizing patch means, and a quick attaching and holding means on the other end of the beam member to latch the clamp to the tire. To accommodate a beadless tire having a track belt mounted therearound, such as shown in U.S. Pat. No. 3,899,220, supra, or tires adapted with a tread belt, the quick attaching and holding means includes alternatively selectable latching brackets on a holding chain which cooperates with a key-shaped slot secured to the end of the rigid beam. When thus attached to the tire and rim, the pressurizing patch means pressures the self-adhering repair patch to the sidewall.

The method for repairing damaged sidewalls of tires which accomplishes the foregoing object comprises attaching a latching means to a rim of the tire, attaching a latching means to the tread means of the tire, and pressurizing a self-adhering patch to the damaged sidewall utilizing the reaction force of the latching means.

BRIEF DESCRIPTION OF THE DRAWINGS

Other objects of this invention will become apparent from the following description and accompanying drawings wherein:

FIG. 1 is a partial isometric view of a clamp constructed in accordance with the teachings of this invention, shown secured to a tire with a track belt;

FIG. 2 is an enlarged plan view of a T-shaped latching bracket used to quick couple the clamp to shoe bolts of the track belt;

FIG. 3 is a fragmentary view, in section, showing a specially barbed latching bracket for attaching the clamp to a tire tread or tread belt; and FIG. 4 is a front elevational view showing the tread latching bracket and the disposition of spaced holding barbs thereon.

DETAILED DESCRIPTION

Referring to FIG. 1, a beadless tire 10 is shown mounted on a standard two-piece rim 11. A partially illustrated track belt 12 is shown in circumventing relationship around the tire and the entire assembly is disposed on a horizontally disposed table 13 for repair of a damaged sidewall 14. The repair of the damaged sidewall is facilitated by a portable clamp 15, constructed in accordance with the teachings of this invention.

The clamp comprises two tubular beam members 16 and 17 telescopically adjustable to the width of sidewall 14, tire rim 11 and the outer periphery of track belt 12. The telescopically adjustable beam members are provided with coupling means 18 and 19, located on the outer ends thereof. A patch pressurizing means 20 is located centrally of the beam members and an adjustable locking screw 21 is adapted to maintain the adjusted position of the coacting beam members.

Coupling means 18 and 19 are constructed for adaption to a beadless tire having circumferentially mounted track belt 12 thereon, such as the one disclosed in U.S. Pat. No. 3,899,220, supra, or a tread belt such as shown at 22 in FIG. 3 of the drawing herein. The track belt essentially comprises an endless belt 23 having a plurality of circumferentially spaced shoes 24 (one shown) attached thereon.

Referring now specifically to clamp 15 and its coupling means 18 and 19, it can be seen that rim coupling means 18 comprises arms 25, secured and disposed perpendicular relative to beam member 16. The arms have sufficient lengths to accommodate all large size tires with enough sidewall clearance to allow selective placement of patch pressurizing means 20 on sidewall 14. Arms 25 are also provided with aligned notches or hooks 26 for engaging a rolled edge 27 of two-piece rim 11, adjacent the sidewall to be repaired.

Tread belt coupling means 19, having the ability to be handled quickly, includes a T-shaped member 28 and an adjustable holding chain 29. The chain extends through and cooperates with a locking key-hole slot 30, formed through a projection of an end plate 31 of the beam 17 for facilitating attachment to track belt 12 of the beadless tire arrangement. As more clearly seen in FIG. 2, T-shaped member 28 and its coacting holding chain 29 engage bolts 32 of the track belt and relative adjustment of holding chain 29 is provided by a narrow slot 33 of key-hole slot 30.

Chain 29 is adjusted and secured in slot 33 by initially utilizing a circular portion 34 from which the narrow axis of selected alternate chain links 35 are placed in narrow slot 33 where the links are held as patch pressurizing means 20 is secured in place. To afford maximum strength or yield resistance when the heads of bolts 32 are engaged, gussets 36 are formed at the juncture of sections 37 and 38 of T-shaped member 28. Section 37 is directly connected to chain 29 by a U-shaped member 28. Section 37 is directly connected to chain 29 by a U-shaped member 39 and a rivet 40.

Referring again to FIG. 1, it can be seen that patch pressurizing means 20 is located substantially intermediate the ends of beam members 16 and 17 and includes a manually actuatable screw 41 coacting with an internally threaded coupling 42, slidably disposed in pairs of complementary longitudinal slots 43 and 44, extending through the beam members. Coupling 42 is positioned over the point on the sidewall to be repaired and is secured in the selected position within slots 43 and 44 by locating nuts 45 located on each end of the coupling. A pressure plate 46, conforming to the shape of sidewall 14, is pivotedly attached to the lower end of screw 41 in any suitable manner, such as by an offset pin 47′ disposed in an annular groove formed about the screw. Manual rotation of the screw is facilitated by a handle located on the end opposite pressure plate 46.

From the foregoing description, it can be seen that clamp 15 can be quickly secured to the damaged tire so that a repair patch P can be secured to the sidewall with considerable force by pressure plate 46, reacting against coupling means 18 and 19. The clamp is readily detachable by simply retracting screw 41 which simultaneously nullifies the holding capability of the coupling means.

Turning now specifically to FIGS. 3 and 4, it can be seen that an alternate latching bracket 47 is provided for securing clamp 15 to a tire having circumferentially disposed tread belt 22 mounted thereon. The latching bracket is provided with a plurality of barbs 48 spaced apart and projecting from a barb supporting leg 49 of bracket 47 which conforms closely to the tread surface. Chain 29 is attached to bracket 47 and to plate 31 by means of key-hole slot 30 in the same manner as described in connection with the embodiment shown in FIGS. 1 and 2.

Finally, while the clamp has been described in connection with a two-piece rim 11 having a rolled edge 27, it is within the scope of this invention to replace arms 25 and hooks 26 of rim coupling means 18 with a chain and a key-hole slot to couple the beam members to a conventional rim, if so desired.

We claim:

1. A portable tire sidewall clamp adapted to apply a patch to a damaged sidewall of a tire mounted on a rim, wherein the tire rim includes an edge or projection thereon, comprising
    a rigid beam of a length suitable for spanning the width of a sidewall of said tire,
    first and second coupling means mounted on opposite ends of said beam for positioning said beam in spaced relationship from a sidewall of said tire, wherein said first coupling means comprises at least one rigid arm adapted to couple said beam to the rim edge of said tire, said arm having a slot formed therein adapted to engage said edge, and
    pressurizing means intermediate the ends of said beam and adjustably mounted thereon for reacting against said beam for holding and applying pressure to a patch.

2. The portable tire sidewall clamp of claim 1 wherein said beam is telescopically adjustable to span sidewalls of various sized tires.

3. The portable tire sidewall clamp of claim 1 wherein said tire is mounted on a vehicle, and wherein said tire rim and said first coupling means are shaped to facilitate installation of said clamp on said tire while said tire remains so mounted.

4. A portable tire sidewall clamp adapted to apply a patch to a damaged sidewall of a tire having a plurality of tread portions defined thereon with shoes secured to them, comprising
    a rigid beam of a length suitable for spanning the width of said sidewall.
    first and second coupling means mounted on opposite ends of said beam for positioning said beam in spaced relationship from said sidewall, said second coupling means including flexible adjustable means to affect quick coupling of said beam to said tire, and wherein said beam has means defining a keyhole slot thereon and wherein said flexible adjustable means includes a T-shaped latching bracket disposed on a holding chain for engaging a tire tread portion at the securing means for the shoes, said chain extending through and cooperating with said keyhole slot for quickly adjusting said latching bracket to said tire tread portion while pressure is being applied to a patch, and pressurizing means intermediate the ends of said beam and adjustably mounted thereon for reacting against said beam for holding and applying pressure to a patch.

5. A portable tire sidewall clamp adapted to apply a patch to a damaged sidewall of a tire comprising
    a rigid beam of a length suitable for spanning the width of said sidewall,
    first and second coupling means mounted on opposite ends of said beam for positioning said beam in spaced relationship from said sidewall, said second coupling means including flexible adjustable means to affect quick coupling of said beam to said tire, and wherein said beam has means defining a keyhole slot thereon and wherein said flexible adjustable means includes a bracket having barbs formed thereon and disposed on a holding chain for engaging said tire, said chain extending through and cooperating with said keyhole slot for quickly adjusting said latching bracket relative to said beam and adapted to secure said latching bracket to said tire while pressure is being applied to a patch, and
    pressurizing means intermediate the ends of said beam and adjustably mounted thereon for reacting against said beam for holding and applying pressure to a patch.

* * * * *